Figure 3:
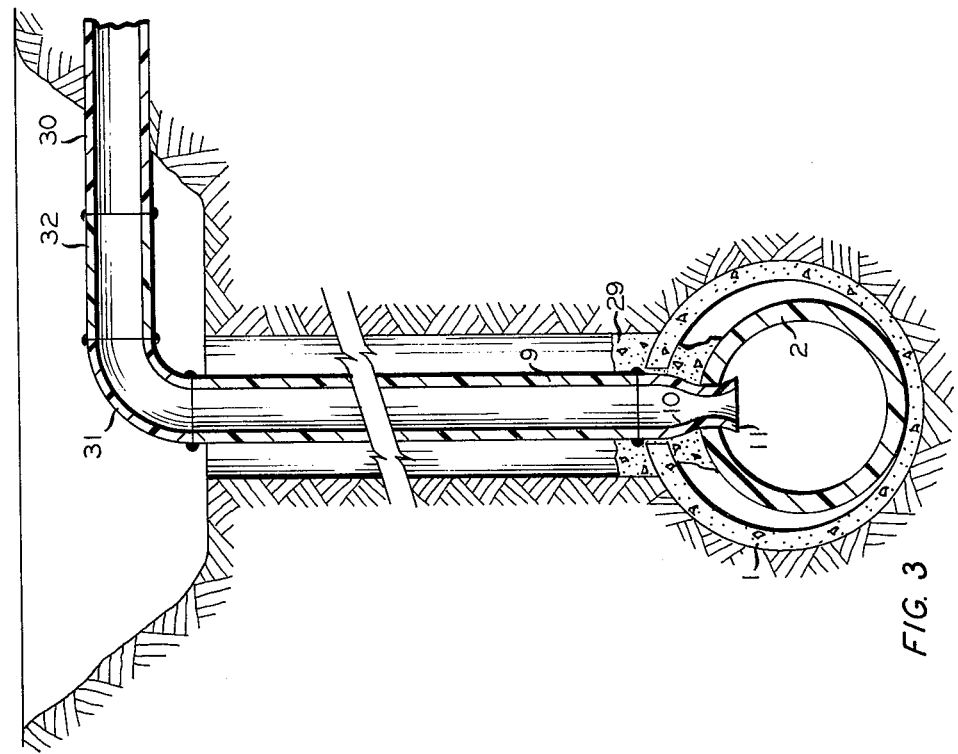

United States Patent [19]
Carroll et al.

[11] 3,953,059
[45] Apr. 27, 1976

[54] PIPE CONNECTION AND PROCESS TO MAKE SAME

[75] Inventors: James C. Carroll, Bartlesville; Arthur H. McElroy, Tulsa, Okla.

[73] Assignee: Phillips Petroleum Company, Bartlesville, Okla.

[22] Filed: Oct. 21, 1974

[21] Appl. No.: 516,365

[52] U.S. Cl. ................................. 285/192; 29/446; 174/DIG. 8; 264/249; 264/DIG. 66; 285/222; 285/381; 285/423; 285/DIG. 10
[51] Int. Cl.² ..................... F16L 41/00; F16L 47/00
[58] Field of Search ........... 285/381, 192, 197, 189, 285/DIG. 10, 222, 213, 198, 199, 423; 264/230, 249, DIG. 66, 343; 174/DIG. 8, 153 G, 75 C; 85/DIG. 2, 37; 403/273, 230, 247; 29/446, 447

[56] References Cited
UNITED STATES PATENTS

| | | | |
|---|---|---|---|
| 2,053,413 | 9/1936 | Armacost | 285/381 X |
| 2,209,403 | 7/1940 | Kittner et al. | 85/DIG. 2 |
| 2,678,224 | 5/1954 | Kooistra | 285/222 |
| 2,994,933 | 8/1961 | Wolfe | 174/153 G X |
| 3,022,482 | 2/1962 | Waterfield et al. | 174/75 C X |
| 3,349,792 | 10/1967 | Larkin | 285/197 X |
| 3,518,359 | 6/1970 | Trimble et al. | 174/153 G |
| 3,730,565 | 5/1973 | Steudler | 285/197 X |
| 3,751,075 | 8/1973 | Rosenberg | 285/423 X |

FOREIGN PATENTS OR APPLICATIONS

| | | | |
|---|---|---|---|
| 1,182,975 | 1/1959 | France | 285/192 |

*Primary Examiner*—Thomas F. Callaghan

[57] ABSTRACT

A connection of a first pipe to the wall of a second pipe or container is disclosed. A hole is formed through the wall of a second pipe or container which is of a diameter smaller than the outer diameter of the first pipe. At least the connection end of the first pipe consists essentially of a polymer of ethylene or a copolymer of ethylene and a small quantity of mono-1-olefins having from 2 to 8 carbon atoms. The polymer preferably has a weight average molecular weight of above 200,000. The connection portion of the first pipe is cold-swaged and inserted into the hole. Due to the mechanical memory of the cold-swaged end of the first pipe, it recovers towards its original shape to form a firm connection between the first pipe and the second pipe or container wall. A sealant can be applied between the first and the second pipe. The connection end of the first pipe is preferably flared outwardly to add strength and to further prevent pulling out of the first pipe from the hole in the second pipe or container wall.

15 Claims, 3 Drawing Figures

PIPE CONNECTION AND PROCESS TO MAKE SAME

This invention relates to the art of connecting a pipe with the wall of a container such as another pipe, tank, vessel, etc.

More particularly, this invention relates to the connection of one pipe to another wherein the first pipe has a smaller outer diameter than the second pipe. This invention is especially concerned with the forming of a tee connection of plastic pipes.

BACKGROUND OF THE INVENTION

Pipe connections are presently made in a variety of ways. In the case of metal pipes a process is known wherein two pipes are connected with their ends in a male-female relationship by heating one end and cooling the other end and inserting the cooled end into the heated end. Plastic pipes are currently connected by welding them together. This is a complicated and time-consuming method. Particular problems arise when these pipe connections have to be made in difficultly accessible locations. The remote tapping of plastic sewer pipes under flooded conditions constitutes an example therefor.

THE INVENTION

It is thus one object of this invention to provide a new process for connecting a plastic pipe to a wall.

Another object of this invention is to provide a new process for connecting a plastic pipe to a wall of e.g., a container, vessel, or another pipe without the necessity of employing temperature differences between the plastic pipe and the wall.

Still another object of this invention is to provide a new process for connecting two pipes which process can be carried out remotely and under flooded conditions.

A further object of this invention is to provide a new pipe connection.

Still another object of this invention is to provide a new pipe connection wherein a smaller plastic pipe is connected to a larger pipe.

Figure 1:
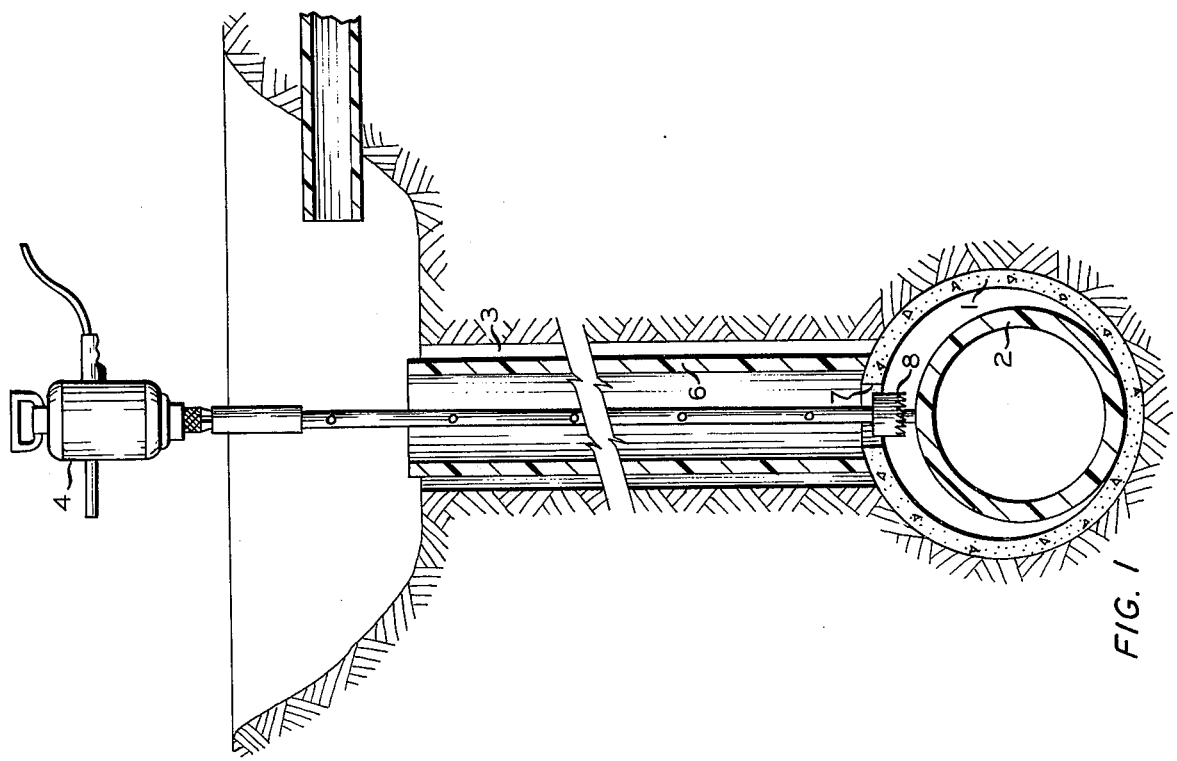
Figure 2:
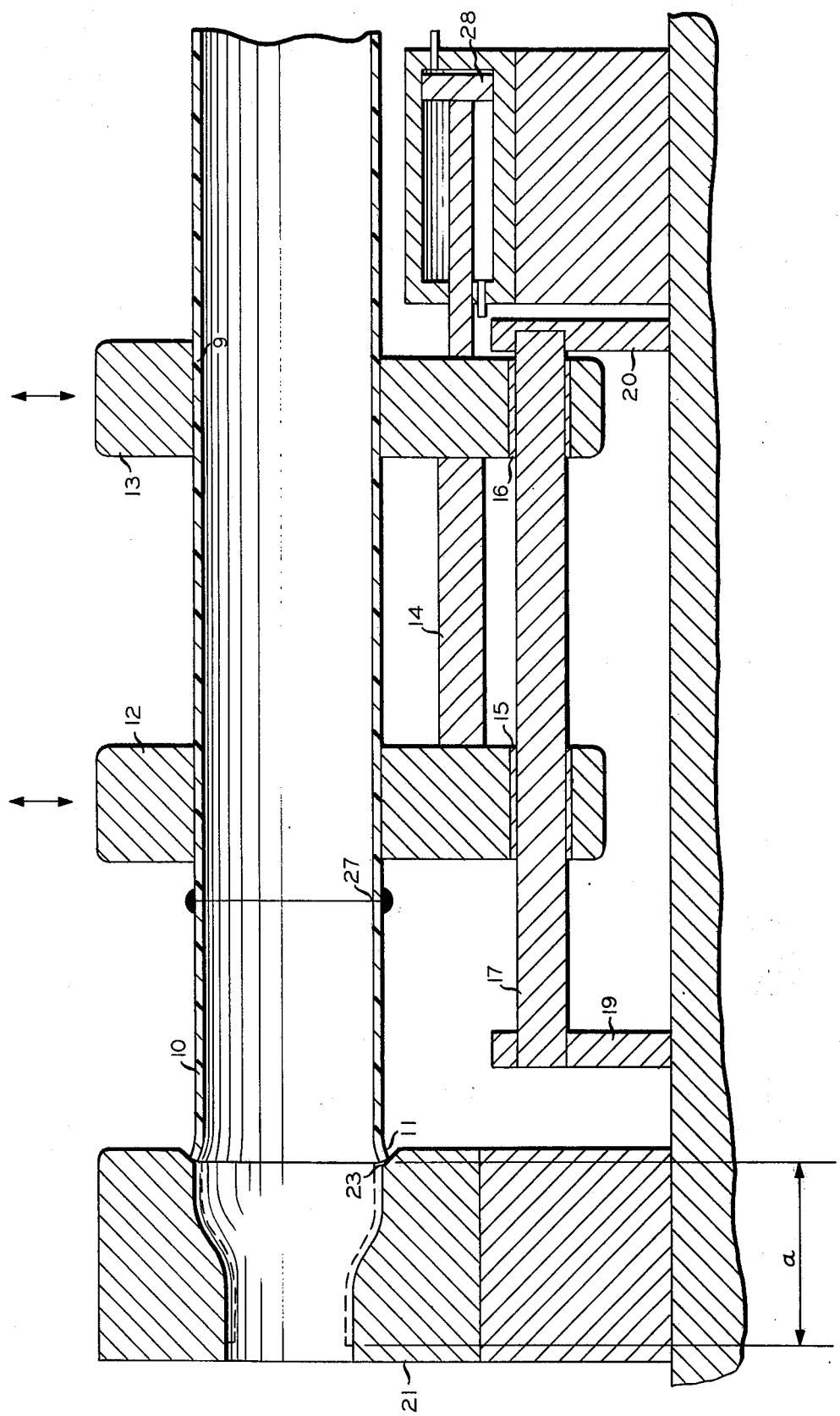

Other features, aspects, objects and advantages of this invention will become apparent to persons skilled in the art from the following detailed description of the invention, the appended claims and the drawing, of which:

FIGS. 1 and 3 show cross sections through an arrangement to tap a sewer line and FIG. 2 shows a cross section through an apparatus for carrying out the cold-swaging step.

In accordance with this invention, we have now found that a pipe having an end section consisting of a cold-swageable polymer material having a mechanical memory can be connected to a wall of a second pipe or container by forming a hole in said wall having a similar but smaller configuration than the outer configuration of said cold-swageable end of said pipe, by cold-swaging said end of said pipe down to an outside configuration similar to but slightly smaller than the hole in the wall, by inserting the cold-swaged end of said pipe into the hole and thereafter maintaining the cold-swaged end of the pipe in the position wanted for a time sufficient so that the cold-swaged end of the pipe while recovering towards its original shape comes into close contact with the wall. "Cold-swaging" of the pipe end as used herein means the following. The pipe end and a die are pressed in the direction of the pipe axis together without softening the plastic pipe by external heat; said die has a smaller but similar configuration as compared to the outer configuration of the pipe; the pipe end is thereby deformed without any removal of material; after removal of the pipe end from the die the thus cold-swaged end because of the mechanical memory of the polymer material recovers towards its original configuration.

The polymer material out of which the pipe or the cold-swageable end of the pipe is made are polymers of ethylene or copolymers of ethylene and a small quantity of other mono-1-olefins having 3 to 8 carbon atoms per molecule; said polymers have a weight average molecular weight of about 200,000 to about 1,000,000, and preferably between 250,000 and 500,000. The preferred copolymers of ethylene and a small quantity of mono-1-olefins having 3 to 8 carbon atoms, particularly copolymers of about 95 weight per cent ethylene and 5 weight per cent butene-1 have a density between 0.940 and 0.965 gram/cc (ASTM D-1505-68) and a melt index of 1.0 to 2.5 grams per 10 minutes (HLMI, ASTM D -1238-70, Condition F).

The cold-swageable end of said pipe in accordance with this invention is formed essentially of the cold-swageable polymer material having a mechanical memory. In addition, the resin may contain conventional additives such as antioxidants, fillers, pigments, and the like. In the presently preferred embodiment, the resin contains about 2 to 3 weight per cent based on the weight of the resin of carbon black. In addition about 0.05 to 0.2 weight per cent of glycerine or ethylene glycol can be added as a processing aid.

The pipe having at least the end portion thereof consisting of a cold-swageable polymeric material with mechanical memory can be connected to a variety of walls, e.g. container walls and especially to a second pipe. Said walls can consist of different materials, e.g. of plastic, fiberglas, hard rubber, clay tile, concrete, steel, aluminum, cast iron, and the like. It is, however, presently preferred to carry out the process for connecting two pipes in order to form a tee connection wherein the one with the cold-swageable end has the smaller diameter and the second pipe, preferably also a plastic pipe, has a larger diameter.

The process of this invention can be carried out with any kind of pipes having at least one end consisting of cold-swageable material having a mechanical memory. Presently preferred are the polymers of ethylene and the copolymers of ethylene and a small quantity of mono-1-olefins having 3 to 8 carbon atoms per molecule, said polymers having a weight average molecular weight of about 200,000 to about 1,000,000, particularly about 250,000 to about 500,000. It is presently preferred to use a plastic pipe consisting essentially of a copolymer of about 90 to 98 weight per cent of ethylene and about 10 to about 2 weight per cent of butene-1.

The ratio of the diameter of the unswaged pipe end to the diameter of the hole to the diameter of the swaged pipe depends upon the material and wall thickness of the pipe to be cold-swaged as well as to a certain degree upon the thickness and material of the wall into which said pipe after being cold-swaged is to be inserted. Generally, the external diameter of the pipe end after being cold-swaged will be up to 15 per cent smaller than the diameter of the unswaged end. The diameter of the hole in the wall accordingly will have a value between the diameter of the unswaged end and the diameter of the cold-swaged end of the pipe.

In accordance with this invention, we also provide a pipe connection wherein a first pipe is connected by its one end to a second pipe having a diameter larger than the first pipe. This first pipe communicates with the interior of the second pipe through a hole in the wall of said second pipe. In accordance with this invention, the diameter of the hole in said second pipe is smaller than the external diameter of the end of said first pipe in its undeformed stage. At least the connection end of the first pipe consists essentially of polyethylene or a copolymer of ethylene and a small quantity of mono-1-olefins having 3 to 8 carbon atoms per molecule and a weight average molecular weight of about 200,000 to about 1,000,000 preferably of about 250,000 to about 500,000. The end of said smaller pipe is inserted in said hole and is under a mechanical stress resulting from a cold-swaging step of said end to make said end fit through said hole and from the recovery of said cold-swaged end of said first pipe towards its original shape and into firm contact with the wall of said hole.

The end of the pipe to be inserted into said hole can be plainly cylindrical. However, it is presently preferred in order to provide a stronger connection between the pipe and the wall that the end of the pipe to be inserted into said wall is provided with an outwardly flared end. This outwardly flared end is to be made before swaging. The flaring of the end can be done by any conventional means. Thus, the pipe end can be flared outwardly by inserting it into a hot liquid, e.g. hot glycol, and then pressing the end over a mandrel. It is, however, presently preferred to flare the pipe end in accordance with the method disclosed in U.S. Pat. No. 3,538,595, while the pipe is extruded as disclosed in U.S. Pat. No. 3,235,881. However, the bushing end of the extruder is operated at a temperature of about 210° to about 250° F., i.e., well above the otherwise employed temperature of below 200° F. The hot pipe is then quenched, e.g. by water spraying, and cut while still relatively hot and soft. The internal tension thus creates the flaring out of the pipe end.

Whereas the end of the pipe to be inserted into said hole and the wall defining the hole can be used without pretreatment other than swaging, it is further presently preferred to abrade the end of the pipe and to flare it. It is also presently preferred, in order to provide a very strong connection and a virtually liquid-tight seal, to apply a sealant or adhesive to the exterior swaged surface of the pipe and/or to the wall of the hole into which the swaged end is fitted. As to the sealants employed, there is no limitation other than that the sealant should be compatible both with the wall material, the pipe material, and the material inside and outside of the connection between the wall and the pipe. Examples of sealants applicable in connection with polyolefin pipes are asphaltic mastic, roofing tar, silicone sealant, and the like.

Since the process of this invention provides in one of its aspects a convenient means for establishing a connection of a pipe with another plastic pipe employed as a sewer line, the process will be illustrated in connection therewith. However, the invention is in no way limited thereto since the process can also be applied to all other pipe connection problems.

Referring now to the figures of the drawing, there is shown a concrete sewer pipe 1 in FIG. 1. This concrete sewer pipe 1 is lined with a plastic pipe 2 made from high density polyethylene. A ditch 3 has been dug and hole 7 has been cut into the concrete pipe employing for instance a diamond core drill. A plastic pipe 6 is inserted into the ditch in order to prevent dirt from falling into the area where the pipe connection is to be made. Into the polyethylene pipe 2 a hole is cut by a drill 4 having a polyethylene cutter 8 attached thereto.

Thereafter, the end of the pipe to be connected to conduit 2 is cold-swaged as shown in FIG. 2. A polyethylene pipe 9 hving a cold-swageable end 10 with a flared end section 11 is arranged in two clamps 12 and 13. The two clamps are connected by a connection piece 14 and are slidably arranged upon a frame 18 by means of bushings 15 and 16 and a rod 17. This rod is carried on the frame via connections 19 and 20. A cold-swaging die 21 is attached to the frame 18. The axis of this cold-swaging die is in alignment with the axis of the pipe 9 or respectively the clamps 12 and 13. The die 21 is made out of sufficiently strong material to resist the swaging forces and the internal surface has the shape shown in FIG. 2 and being rotationally symmetrical around the axis of the pipe. The surface is smooth.

The pipe end 10 is cold-swaged in this apparatus as follows:

The pipe assembly 9 having a flared end section 10, either as a single pipe or as a section of pipe welded onto a suitable unit as shown in FIG. 2, is clamped into the clamps 12 and 13. The flared end 11 then just abuts the internal surface of the die 21. Pressure is then applied to the clamps, e.g. by a double acting hydraulic assembly 28. Thereby, the pipe is pushed into the die and swaged into the shape shown in dotted lines in FIG. 3. At the end of this step of cold-swaging, the end 10 of the pipe is retracted out of the die. Then the clamps 12 and 13 are opened, the pipe 9 with the cold-swaged end 10 is taken out and if desired, a sealant material such as a roofing tar is brushed on the cold-swaged end.

Thereafter, the cold-swaged end of the pipe is inserted into the hole drilled into the pipe 2 as described in connection with FIG. 1. The axis of pipe 2 and the axis of pipe 9 intersect at an angle of about 90°. Pipe 9 is maintained in its position with the cold-swaged end protruding into the interior of pipe 2 for a time sufficient for the recovery of the pipe end towards its original shape and into firm contact with the wall defining the hole drilled into pipe 2. Thus after a few minutes the pipe end 10 is in firm contact with the whole wall. The flared end 11 protrudes from the wall of pipe 2, thus creating a strong and tight connection between the two pipes.

The final connection between the pipes is shown in a cross-sectional view in FIG. 3. A dry mix of concrete 29 has been filled into the ditch in order to give additional strength and to fix the pipe 9 in its location. The lateral sewer line 13 is connected to pipe 9 by 90° connection piece 31 and a connection piece 32 which are all welded together in a manner known per se. The end piece 10, the pipe 9 and the knee 31 and the connection piece 32 can be welded together before the cold-swaging step. This leaves only the final welding step to be carried out after the pipe connection has been made. In addition, the knee 31 and the connection piece 32 function as a handle to insert the pipe 9 with the cold-swaged end 10 into the hole in the pipe 2.

In the following examples the invention is described specifying in detail the materials employed as well as the results obtained. The first example is given to show the velocity at which the cold-swaged end of a polyethylene pipe recovers towards its original shape. The second example is given to show the properties of pipe connections made in accordance with this invention.

EXAMPLE I

Three pieces of Schedule 40 plastic pipe, equivalent to commercial wrought-iron steel data in "Standard Pipe" (Technical Paper 409, Crane, 10 May 1942, p. 85), and one piece of 100 psi pressure pipe of 24-inch length, 4-½-inch external diameter and 4-inch internal diameter were used. The pipes were high density polyethylene pipes manufactured and sold under the trademark Driscopipe 7600 by the Phillips Petroleum Company, Bartlesville, Oklahoma. The resin from which the pipes were made is an ethylene-butene-1 copolymer made out of about 95 weight per cent of ethylene and 5 weight per cent of butene-1 and having a weight average molecular weight of about 275,000, a density of 0.941 g/cm$^3$, a high load melt index of 2.0 g/10 min. (ASTM D-1238-70, Condition F); the resin contained 2 weight per cent carbon black, 0.1 weight per cent glycerine, 0.1 weight per cent 4,4'-thio-bis(6-tert-butyl-m-cresol) (Santonox, sold by Monsanto). The end of the sample pipe No. 1 was heated for 2 minutes in ethylene glycol at 275° F. Then the softened end was forced over a flaring mandrel and immediately thereafter quenched with cold water. Thus the flared end was set. The flared end portion had an outside diameter right at the flared end of the pipe of about 4¾-inch. The length of the flared end portion in axial direction is about ½ inch. The pipe sample No. 2 was flared by the same method; this pipe sample was 100 psi pressure pipe. The pipe sample No. 3 was treated in the same way as the pipe sample No. 1 in order to show the reproducibility of the results. The pipe sample No. 4 was not flared but was used with a plain end.

All these plastic pipe samples were then cold-swaged as described above in connection with the FIG. 3. The pipes were inserted into the swaging press and the pressure was exerted for about 1½ seconds. The ends of these pipes in a length of about 3 inches were pressed into a die to reduce the outside diameter to 4⅛ inches. After the coldswaging step the diameter of the pipe end was measured at different times after its removal from the die. The results of this measurement are shown in the following Table I.

have passed. The recovery is, on the other hand, sufficiently slow so that the pipe can be inserted and adjusted in its desired position within the hole in the wall within a period of about 10 minutes after the removing of the pipe from the cold-swaging die as will be shown in the following example.

EXAMPLE II

A Schedule 40 plastic pipe with flared end was cold-swaged as described in the previous example, runs 1 and 3. The pipe was kept for 10 seconds in the die at ambient temperature of 80° F. The external end diameter was measured in ten one-minute intervals and then in 5 10 minute intervals. The results are shown in the following table.

TABLE II

| Original diameter | | 4.731 | in. | After | 8 | min. | 4.292 |
|---|---|---|---|---|---|---|---|
| Swage diameter | | 4.152 | " | " | 9 | " | 4.294 |
| After | 1 min. | 4.220 | G2 | " | 10 | " | 4.295 |
| " | 2 " | 4.244 | " | " | 20 | " | 4.313 |
| " | 3 " | 4.263 | " | " | 30 | " | 4.318 |
| " | 4 " | 4.271 | " | " | 40 | " | 4.326 |
| " | 5 " | 4.278 | " | " | 50 | " | 4.327 |
| " | 6 " | 4.283 | " | " | 60 | " | 4.334 |
| " | 7 " | 4.289 | " | | | | |

The recovery is somewhat related to temperature and dwell time in the swaging die. The results of Table II show that there is sufficient time — about 2½ minutes — to cover the cold-swaged pipe end with a sealant and to insert it into the 4¼ inch hole.

EXAMPLE III

Into each of 12 pieces of a main pipe of high density polyethylene having an 8 inch inside diameter and an 8.625 inch outside diameter, and a length of 24 inches, a 4¼-inch diameter hole was drilled, the axis of the drill and the axis of the main pipe intersecting at 90°. Twelve pieces of 4½-inch external diameter pipes were cold-swaged as described above and in connection with Example I. Eleven of these twelve samples were sanded at the cold-swaged end; one of them was used unsanded with a plain end. Two samples were employed without sealant and to ten of the samples sealants were applied by brushing to the outside of the cold-swaged end (as shown in the following table). Pressure tests of the pipe connections were made and pull-out tests were carried out. The results of these tests are shown in the following

TABLE I

| Run No. | 1 | 2 | 3 | 4 |
|---|---|---|---|---|
| Type of Pipe | SCH 40 | 100 psi | SCH 40 | SCH 40 |
| 4 ½ inch external diameter before cold-swaging | flared end | flared end | flared end | plain end |
| External diameter of swaged end after: | | | | |
| 30 seconds | 4.156 | 4.125 | 4.156 | 4.125 |
| 3 hours | 4.375 | 4.375 | 4.375 | 4.312 |
| 19 hours | 4.375 | 4.375+ | 4.375 | 4.312 |
| 67 hours | | | | |
| at flared end | 4.42 | 4.42 | 4.41 | |
| at cylindrical neck | 4.32 | 4.32 | 4.33 | 4.33 |
| 6 days | | | | |
| at flared end | 4.42 | 4.42 | 4.41 | |
| at cylindrical neck | 4.34 | 4.32 | 4.33 | 4.33 |

(all diameters shown in inches)

The results contained in this table show that the cold-swaged end recovers to a steady state before 3 hours ing table.

TABLE III

| Run | Plastic Pipe Corresponding to | Sealant | Sanded End | Swage Length | Pressure, psi | Pull Out Force (lbs.) for ½" per Minute |
|---|---|---|---|---|---|---|
| 1 | SCH 40 | No | Yes | 2" | ½ | 60 |
| 2 | 100 psi | No | Yes | 2" | ½ | 60 |
| 3 | SCH 40 | Raycohesive B2 | Yes | 2" | ½ | — |
| 4 | SCH 40 | Raycohesive B2 | No | 2" | 1-¾ | 162 |
| 5 | 100 psi | Raycohesive B2 | Yes | 2" | 1 | 182 |
| 6 | 100 psi | Raycohesive B2 | Yes | 2-¼" | ¾ | — |
| 7 | SCH 40 | Silicone Seal | Yes | 2-¼" | 3-½ | 60 |
| 8 | SCH 40 | Silicone Seal | Yes | 2-¼" | 8 | 64 |
| 9 | 100 psi | Silicone Seal | Yes | 2-¼" | 2-¾ | 82 |
| 10 | 100 psi | Silicone Seal | Yes | 2-¼" | 3-¾ | 72 |
| 11 | SCH 40 | Scotch Grip | Yes | 2-¼" | 1 | 120 |
| 12 | 100 psi | Scotch Grip | Yes | 2-¼" | 3-¼ | 160 |

"Silicone Seal" is a silicone rubber sealant, sold by General Electric, Waterford, N.Y.; "Scotch Grip" is a rubber sealant sold as industrial adhesive No. 4693 by 3M Co., St. Paul, Minnesota; "Raycohesive B2" is a rubber sealant contact adhesive sold by Raycon Instruments, Boulder, Colorado.

The pressure test was made by covering the three ends of the pipe connection with plates having a connection to a source of air. The pressure was measured that was required for a leak to develop. The results in the table show that by the present invention sufficiently airtight connections between plastic pipes can be made which are especially useful in the tapping of sewer lines.

The pullout tests, the results of which are shown in the above Table III, were made on an Instron Tensile Tester by clamping the joint in the tester and pulling at the rate of ½in/min. The force exerted on the joint required to separate the two sections of pipe is recorded in the table. The results show that the pipe connections made in accordance with this invention exhibit good strength against separation by pulling. Since the process of this invention employs pipes having a larger external diameter than the hole into which they are inserted, the pipe connection made in accordance with this invention is strong and rigid both towards forces tending to pull out the smaller pipe and forces tending to push the smaller pipe into the larger pipe.

Reasonable variations and modifications which will be apparent to those skilled in the art can be made in this invention without departing from the spirit and scope thereof.

We claim:

1. A process for connecting one end of a first pipe to a second pipe, said one end of said first pipe consisting essentially of a polymer selected from the group consisting of polyethylene and copolymers of ethylene and a small quantity of at least one mono-1-olefin having 3 to 8 carbon atoms per molecule, said polymer having a weight average molecular weight of about 200,000 to 1,000,000, said one end being cold-swageable and recovering after cold-swaging toward its original shape without the necessity of employing heat differences, which process comprises
   a. forming a hole through the wall of said second pipe which is smaller than but similar to the outside configuration of said one end of said first pipe;
   b. cold swaging said one end of said first pipe to provide an outside configuration similar to but smaller than said hole in said wall;
   c. inserting said deformed one end of said first pipe into said hole and,
   d. retaining said one end in its position without employing temperature differences while said one end recovers from its deformed configuration towards its original configuration into close contact with said wall.

2. A process in accordance with claim 1 wherein said end of said first pipe consists essentially of polyethylene.

3. A process in accordance with claim 1 wherein said end of said first pipe consists essentially of a copolymer of about 90 to 98 weight per cent ethylene and of about 10 to 2 weight per cent butene-1.

4. A process in accordance with claim 1 wherein:
   a. said one end of said first pipe is flared before the cold-swaging step, so that both the unflared pipe and the flared end section of the pipe before the cold-swaging step have a similar but larger configuration than the hole;
   b. the flared end of the pipe is cold-swaged so that the dimensions both of the flared end section and of at least a portion of the unflared pipe end section are smaller than the hole;
   c. the pipe is then inserted with its cold-swaged end section in said hole so that the cold-swaged flared end section protrudes from the other side of the hole; and
   d. wherein the pipe is retained in the designated position until the cold-swaged end of the pipe has recovered towards its original shape to form a firm connection between the pipe and the wall, the flared end section protruding from said wall.

5. A process in accordance with claim 1 wherein a sealant is arranged in the space between the wall of the hole in the second pipe and the cold-swaged end of the first pipe.

6. A process in accordance with claim 5 wherein said sealant is applied to the cold-swaged end of the first pipe which end is then inserted into the hole in the wall.

7. A process in accordance with claim 1 comprising pressing said one end of said first pipe into a die in the direction of the pipe axis, thereby deforming said one end of said first pipe without applying external heat and thereby providing said one end with an outside configuration similar to but smaller than said hole through said wall.

8. A pipe connection comprising
   a first pipe having at least one end thereof consisting essentially of a polymer selected from the group consisting of polyethylene and copolymers of ethylene and a small quantity of another mono-1-olefin having from 3 to 8 carbon atoms per molecule, said polymer having a weight average molecular weight of about 200,000 to about 1,000,000 and said one end being cold swageable and having a mechanical memory, connected to said one end of said pipe a second pipe of larger diameter than the first pipe having a hole formed in the wall of said second pipe through which said cold-swageable end of said first pipe is inserted, the diameter of said hole being smaller than the external diameter of said first pipe, said one end of said first pipe being under a mechanical stress pressing towards the wall of said hole, said stress resulting from a coldswaging step wherein the end of said first pipe was cold-swaged to fit through said hole and from the recovery of said end of said first pipe from the coldswaged shape toward its original shape and into firm contact with the wall of said hole without employing temperature differences.

9. A pipe connection in accordance with claim 8 wherein said connection end of said first pipe consists essentially of polyethylene.

10. A pipe connection in accordance with claim 9 wherein at least the end of the first pipe to be cold-swaged consists essentially of a polymer of ethylene and 1-butene being solution polymerized from ethylene and 1-butene in the presence of a chromium-oxide catalyst, said polyolefin having a weight average molecular weight of about 275,000, a density of 0.94 gram/cc, and high load melt index of 2.0.

11. A pipe connection in accordance with claim 9, wherein said connection end of said first pipe consists essentially of a copolymer of about 90 to 98 weight per cent ethylene and about 10 to 2 weight per cent butene-1.

12. A pipe connection in accordance with claim 8 wherein a sealant or adhesive is arranged in the space between the wall of the hole in the second pipe and the cold-swaged end of the first pipe.

13. A pipe connection in accordance with claim 8 wherein said end of said first pipe is flared outwardly and the flared section protrudes from said hole into the interior of said second pipe.

14. A pipe connection in accordance with claim 13 wherein said first pipe consists of an end portion comprising said flared end and having a length of at least about 50 per cent more than the length of the cold-swaged section and connection to said end a piece of pipe of preselected length.

15. A pipe connection in accordance with claim 14 wherein said end portion and said pieces of pipe of pre-selected length both consist essentially of a polyolefin and are welded together.

\* \* \* \* \*